US008223191B2

(12) United States Patent
Elbaz et al.

(10) Patent No.: US 8,223,191 B2
(45) Date of Patent: *Jul. 17, 2012

(54) DELAY REDUCTION FOR TRANSMISSION AND PROCESSING OF VIDEO DATA

(75) Inventors: Moshe Elbaz, Kiriat Bialik (IL); Noam Eshkoli, Tel-Mond (IL); Ilan Yona, Tel Aviv (IL); Aviv Eisenberg, Be'er (IL)

(73) Assignee: Polycom, Inc., Pleasanton, CA (US)

( * ) Notice: Subject to any disclaimer, the term of this patent is extended or adjusted under 35 U.S.C. 154(b) by 386 days.

This patent is subject to a terminal disclaimer.

(21) Appl. No.: 12/467,831

(22) Filed: May 18, 2009

(65) Prior Publication Data

US 2009/0284581 A1 Nov. 19, 2009

Related U.S. Application Data

(63) Continuation of application No. 10/344,792, filed on Jul. 30, 2003, now Pat. No. 7,535,485, which is a continuation of application No. PCT/IL01/00757, filed on Aug. 14, 2001.

(60) Provisional application No. 60/225,491, filed on Aug. 15, 2000.

(51) Int. Cl.
*H04N 7/14* (2006.01)

(52) U.S. Cl. ............... 348/14.12; 348/14.08; 348/14.09; 348/14.13

(58) Field of Classification Search .... 348/14.01–14.16; 375/240.01, 240.24

See application file for complete search history.

(56) References Cited

U.S. PATENT DOCUMENTS

| 5,768,533 | A | * | 6/1998 | Ran | 709/247 |
| 5,841,763 | A | * | 11/1998 | Leondires et al. | 370/260 |
| 6,285,661 | B1 | * | 9/2001 | Zhu et al. | 370/260 |

FOREIGN PATENT DOCUMENTS

WO  WO 9916235 A2 * 4/1999

* cited by examiner

*Primary Examiner* — Melur Ramakrishnaiah
(74) *Attorney, Agent, or Firm* — Wong, Cabello, Lutsch, Rutherford & Brucculeri, LLP

(57) ABSTRACT

The present invention is a method and system for reducing delay in video communication, including, for example, video transcoding and continuous presence in a multipoint multimedia conference. The video communication control unit reduces such delay by processing a video stream in a small number of macroblocks referred to as "chunks," without waiting to get a full frame of video data. Instead, the incoming video stream is converted into decoded chunks. These decoded chunks are transferred to an output module without waiting to decode an entire frame. An encoder in the output module encodes the decoded chunks (also referred to as encoder chunks), and transfers them to an end user without waiting for the entire frame to be processed. Thus, reducing the delay in waiting for the entire frame of video data provides improved real-time video communication.

16 Claims, 4 Drawing Sheets

DELAY REDUCTION FOR TRANSMISSION AND PROCESSING OF VIDEO DATA

CROSS REFERENCE TO RELATED APPLICATIONS

This application is a continuation of application Ser. No. 10/344,792, filed Jul. 30, 2003, now U.S. Pat. No. 7,535,485, which is a national stage filing of, and claims priority to, international application PCT/IL01/00757, filed Aug. 14, 2001, which in turn claims priority to U.S. provisional patent application Ser. No. 60/225,491, filed Aug. 15, 2000. The entire contents of each of these applications are hereby incorporated by reference.

BACKGROUND

1. Field of Invention

This invention relates to the field of video communication and, more particularly, to providing real-time video conferencing while minimizing transmission and processing delays.

2. Description of Background Art

As the geographical domain in which companies conduct business continues to expand, video teleconferencing technology attempts to bring the world closer together. But, as with most user based technologies, users can be very critical and demanding with regards to the quality of the technology and the comfort of the user interface. One of the main complaints with regards to video communication technology is the delay that occurs between video streams sent between participants of the video conference. The delay tends to decrease the quality of the video communication experience as participants inadvertently start talking at the same time, yet are several words into the process before the conflict is realized. The greater the delay resulting from the processing or the transmission of data, the more difficult communication is between the participants.

There are several factors that contribute to the delay in the video stream. One such factor arises when the encoding of the video streams is performed at user or participant terminals where the video stream is created. Another such factor arises simply due to transmission delays that accrue when transmitting the encoded video stream through a network to a Video Communication Control Unit (VCCU), like but not limited to, a Multipoint Control Unit (MCU), a Multimedia Gateway, etc. Typically, a VCCU serves as a switchboard and/or conference builder for the network. In operation, the VCCU receives and transmits coded video streams to and from various user terminals or codecs.

Another contribution to the delay of the video stream is due to the processing performed on the encoded video stream within the VCCU. Once the VCCU completes its processing of the video stream, additional delays are incurred while the processed video stream is transmitted through the network to target user or participant terminals. After the participant terminals receive the video stream, additional delays are caused by the decoding of the encoded video streams back to normal video.

The VCCU may be used in several modes, such as video switching, transcoding, and continuous presence. In video switching, the VCCU serves as a switchboard, and the video stream is directly transmitted from a source terminal to a target terminal. In video switching operation, the input stream is passed through the VCCU, and the VCCU is not required to perform any video processing. Although video switching achieves a reduction in the delay of the video stream, it is not adequate to solve the present problem because, in many situations, video switching cannot be utilized. Two such situations arise where transcoding is required or a continuous presence mode of operation is provided.

Transcoding of the video stream is required when the input stream does not match requirements of the target user terminal (such as bit rate, frame rate, frame resolution, compression algorithm, etc.). Transmission of the video streams in this mode requires video processing, which may result in delays due to the required processing time, and thus, a less than optimal video conference.

Continuous presence ("CP"), involves video mixing of the video data from various source user terminals, thus resulting in a need for video processing. Both transcoding and the continuous presence mode cause delays in the delivery of video streams within a video communication system. Thus, it is evident that there is a need in the art for a technique to eliminate or alleviate the delays in the video stream to improve the video communication experience.

The elaborate processing required in transcoding and continuous presence operation must be done under the constraint that the input streams are already compressed by a known compression method based on dividing the video stream into smaller units, such as GOP (group of pictures), pictures, frames, slices, GOB (Group Of Blocks), macro blocks (MB) and blocks as described in standards such as the H.261, H.263, and MPEG standards.

A typical VCCU, like the MGC-100 manufactured by Polycom Networks Systems, contains a number of decoders and encoders. Each decoder receives a compressed stream of a known compression format, and decodes or uncompresses the compressed stream. The uncompressed frames are then scaled and rearranged to form a desired output layout. The resulting frame is then appropriately compressed by the encoders and transmitted to the desired target terminals.

FIG. 1 is a block diagram illustrating a typical embodiment of video ports within a VCCU 100. Two video ports are illustrated by way of example and for convenience of presentation; however, those skilled in the art will realize that the VCCU 100 can have many such video ports. The VCCU 100 receives compressed video streams from various terminals and places the compressed video streams onto a backplane bus 140. Each video port 130 within the VCCU 100 is dedicated to one end terminal. Uncompressed video is shared through a dedicated video bus 150, capable of transferring high bandwidth video streams at given maximum resolution under the maximum frame rate.

The description of the present invention refers to a terminal in several names like: end terminal, terminal, end-point, endpoint, and end user terminal. In general, a terminal is an endpoint on the network that provides for real-time, two-way communications with another terminal, Gateway, or Multipoint Control Unit. This communication consists of control, indications, audio, moving color video pictures, and/or data between the two terminals. A terminal may provide speech only; speech and data; speech and video; or speech, data, and video.

Once a compressed video stream from an end user terminal is placed onto the backplane bus 140, the video stream begins to accumulate in an input buffer 125 before being provided to a decoder 120. The decoder 120 converts the compressed video stream into uncompressed frames, and the uncompressed frames are placed into input triple frame memory 123. The input triple frame memory 123 consists of three frame buffers. Working in a cyclic mode, one buffer is needed for the frame constructed by the decoder 120. The second buffer is used for transmission over the video bus 150. When the decoder 120 yields a full frame in the middle of a frame cycle (i.e., the transmitted frame buffer has not completed the transmission of its current frame), an additional buffer is needed to prevent stalling of the decoder 120.

The uncompressed frame transmitted from the input triple frame memory 123 is scaled according to the desired output layout by input scaler 127, and then placed onto the video bus 150. The appropriate video ports 130 then retrieve the scaled frame from the video bus 150, using builder 112, based on the layout needed to be generated. The builder 112 collects one or more frames from at least one video port as needed by the layout, and arranges the frames to create a composite output frame. An output scaler 117 then scales the composite frame to a desired resolution and stores the scaled composite frame in an output triple frame memory 115.

The output triple frame memory 115 consists of three frame buffers. Working in a cyclic mode, one buffer is needed for the frame received from the video bus 150. The second buffer is used for the frame being encoded by an encoder 110. When the encoder 110 receives a new frame from the video bus 150 in the middle of a frame cycle (i.e., the encode frame buffer is still busy), the frame is stored in this third buffer to prevent loss of the frame. The encoder 110 then encodes the frame from the output triple frame memory 115, and stores the compressed data in an output buffer 113. The data residing in the output buffer 113 is then transferred to the backplane bus 140, and ultimately to the end user terminal.

In the above description there is a total separation between the encoders and the decoders. The reason for this separation can typically be attributed to using off-the-shelf encoders/decoders, such as an 8×8 VCP processor, which were originally designed for use within end-points. The use of such off the shelf components forces the designer to design the video bus 150 as a video screen for the decoder and as a video camera for the encoder with video signals such as horizontal sync and vertical sync. The decoders output a newly uncompressed frame only when it was completely decoded. The encoders use the scaled frames only after the frame is fully loaded into their memory.

FIG. 2 illustrates resulting delays in a typical video conference where two endpoints are connected to each other through a common VCCU. End-user A 25 transmits at a maximum frame rate of 30 frames per second ("fps") while end-user B 21 transmits at a maximum of 15 fps. The first decoded MB of each incoming frame waits in the input triple frame memory 123 (FIG. 1) until the whole frame received from the backplane bus 140 (FIG. 1) is fully decoded. This process results in a delay of one input frame. Additionally, the decoded frame is delayed until the start of the next video bus frame cycle before being transmitted along with the rest of the frame to the video bus 150 (FIG. 1), contributing an average delay of half a bus frame. The resulting delay to the decoder can be calculated by the following equation:

$$DecoderDelay = 1/InputFrameRate + 1/(2*VideoBusFrameRate)$$

Next, the encoder path of the video port 130 (FIG. 1) retrieves the entire frame residing on the video bus 150, and stores the frame into the output triple frame memory 115 (FIG. 1). Additionally, the first MB is delayed until the encoder 110 (FIG. 1) is ready to start encoding a new frame (27 for user A and 29 for user B). The average delay is therefore:

$$EncoderDelay = 1/VideoBusFrameRate + 1/(2*OutputFrameRate)$$

The total delay resulting from video sharing over a dedicated video bus simulating a screen on one side (decoder side) and a camera on the other side (encoder side) is:

$$Delay = 1/InputFrameRate + 3/(2*VideoBusFrameRate) + 1/(2*OutputFrameRate)$$

Thus, it is evident that current technology utilized in multimedia video conferences results in significant video delays. In low frame rate connections, this delay can amount to a few hundreds milliseconds. This creates a significant degradation in the quality of the conference when considering that the delay is caused at both endpoints, and is typically of the same magnitude. Therefore, there is a need in the art for a method and system for reducing the delay in video transcoding and continuous presence for video conferencing technology.

Prior art systems offer an approach to reduce the delay, however communication is limited. For example, prior art terminals have to use the same standard, or one layout (e.g., Hollywood Square, the screen is divided into four pictures of the same size) with QCIF to CIF Resolution. The present invention overcomes these limitations in that it can operate in several resolutions simultaneously, with any number of participants, as well as other layouts and standards.

SUMMARY OF THE INVENTION

The present invention solves the above-described problems by providing a system and method for reducing delays resulting from video transcoding and continuous presence. In general, the present invention removes the need to delay processing video data until an entire frame is received. Instead, the system processes an incoming data stream in pieces (or "chunk by chunk"), thus reducing delays from waiting for the entire frame, and thereby improving quality of a video conference.

More particularly, the present invention includes a video processing system that provides an improved real-time performance in processing video data streams. The video data streams are typically composed of a series of frames with each frame consisting of a plurality of blocks. Rather than processing the video stream on a frame by frame basis, the present invention achieves a shorter delay by processing the video data stream on a segment by segment of a frame basis. The system includes video input modules that receive video input streams from associated source endpoints. Each of the video input modules is coupled to video output modules through a common interface. The video input modules receive a compressed video input stream from the source endpoints, decode the compressed video input stream in small units (i.e., chunks), such as a few MBs, without waiting to get a full frame, and transfer the chunks of uncompressed data to the common interface before a full frame is accumulated. The video output modules receive the chunks of uncompressed data from the various input modules via the common interface, and build the required layout from the uncompressed data in a memory, which resides in the output modules. An encoder then encodes chunks of uncompressed data, from the memory, to create chunks of compressed video data. These chunks of compressed video data are then output for transmission to a target end point before a full frame is accumulated.

In a particular embodiment of the present invention, an incoming compressed video data stream is received by an input module from a backplane bus. This data is converted by a chunk decoder located in the input module into decoded chunks, and pixel data corresponding to each decoded chunk is stored in memory.

An output module retrieves the uncompressed chunks from the common interface. The output module contains an editor module, which retrieves the uncompressed chunks and stores these chunks into chunk buffers. The input data is written from the various chunk buffers into an input memory of the editor in the appropriate location. Concurrently the chunk to be encoded is read from the memory and processed by the chunk encoder. Once the outgoing compressed video chunk is generated, the chunk is transferred to a backplane bus in the VCCU. This process, by simultaneously writing the input data to the input memory of the editor and reading the appropriate chunk to be encoded from the memory, provides the most current information to the chunk encoder.

Thus, the present invention advantageously processes the video data stream in a video communication system to reduce delays while providing optimal transmission for a video conference with improved real-time performance.

DETAILED DESCRIPTION OF THE INVENTION

Turning now to the figures in which like numerals represent like elements throughout the several views, exemplary embodiments of the present invention are described. Although the present invention is described as utilizing a video conferencing system, those skilled in the art will recognize that the present invention may be utilized in any sort of system with an incoming data stream which may be distributed to end users.

Figure 1:
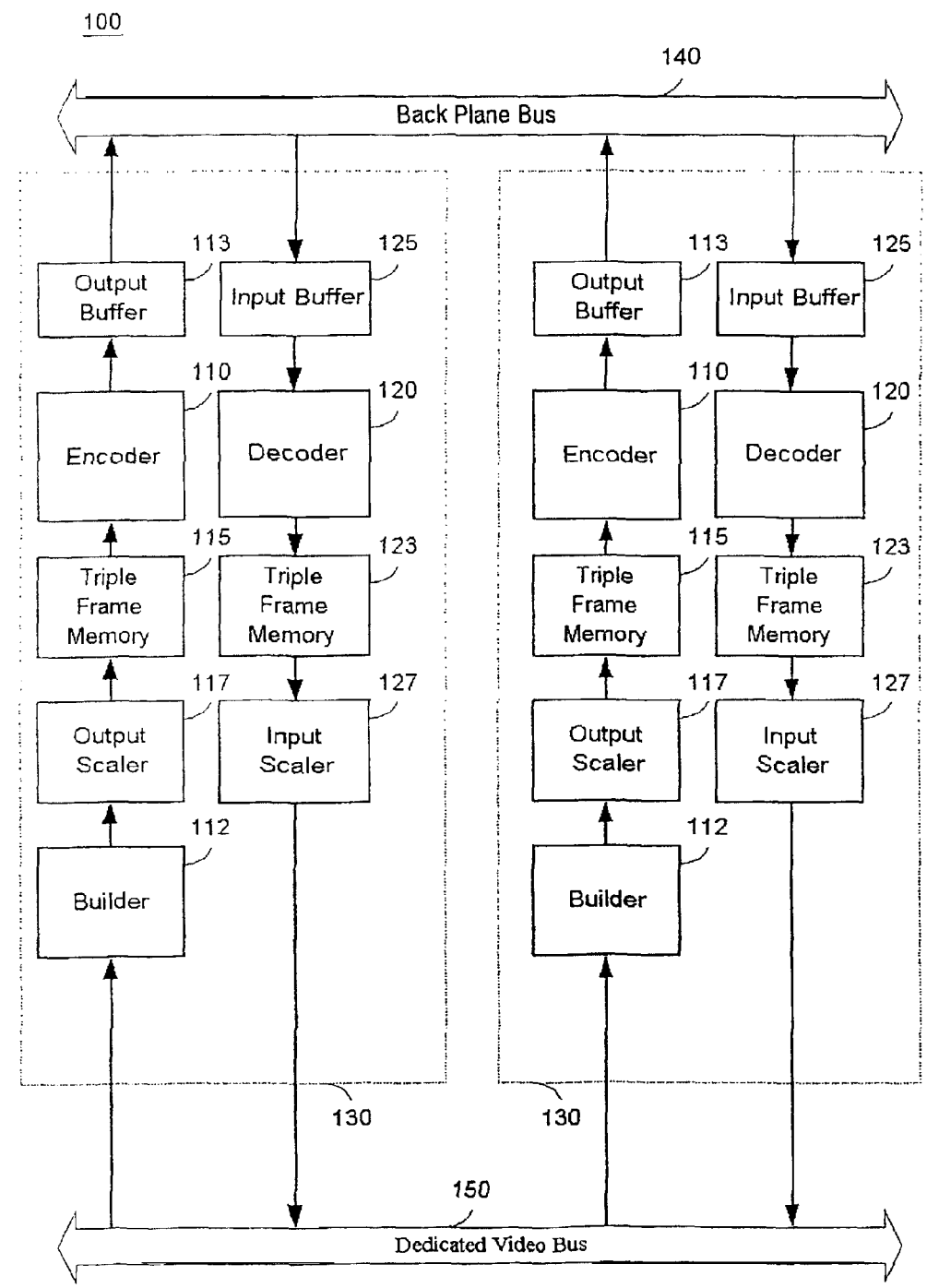
FIG. 1 is a block diagram of a prior art video communication control unit (VCCU)
Figure 2:
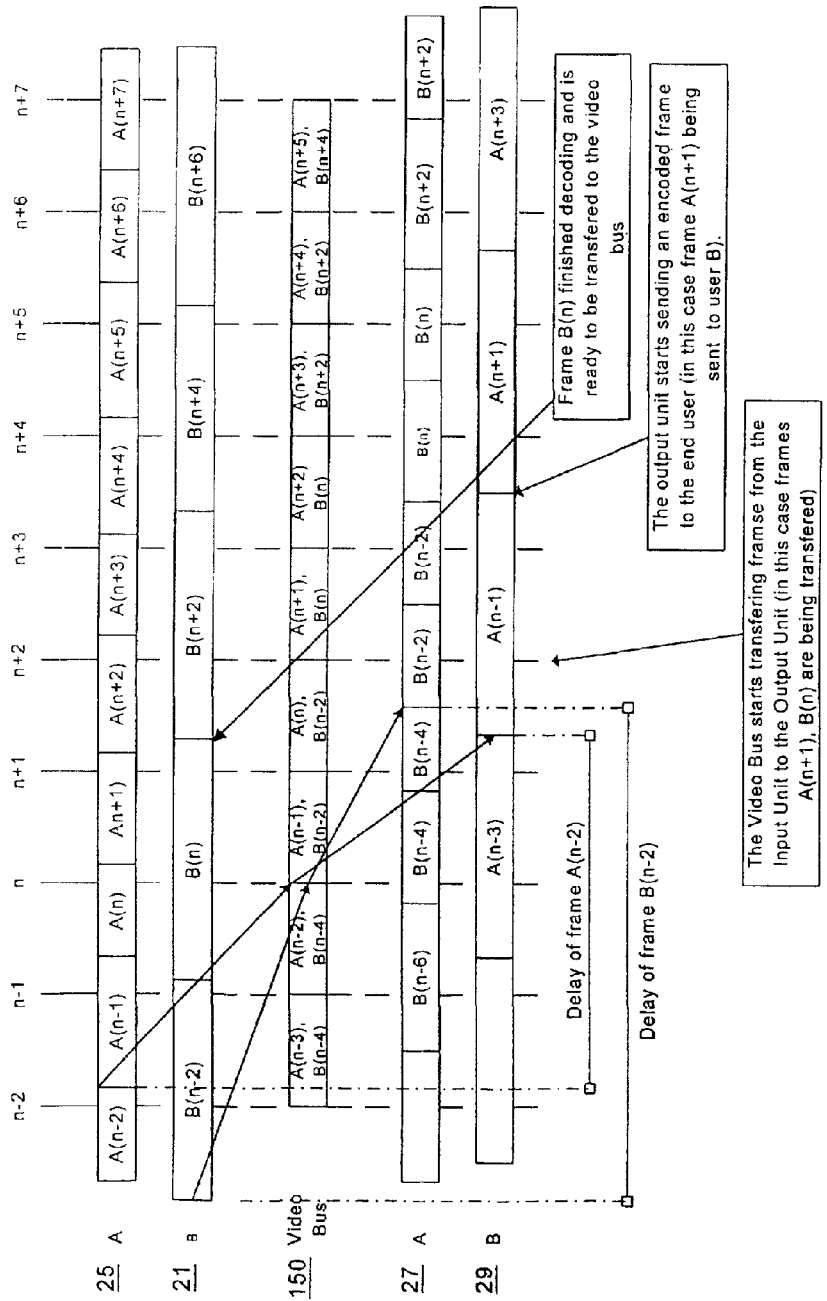
FIG. 2 is a timing diagram illustrating resulting delays in a typical conference where two endpoints are connected to each other through the prior art VCCU.
Figure 3:
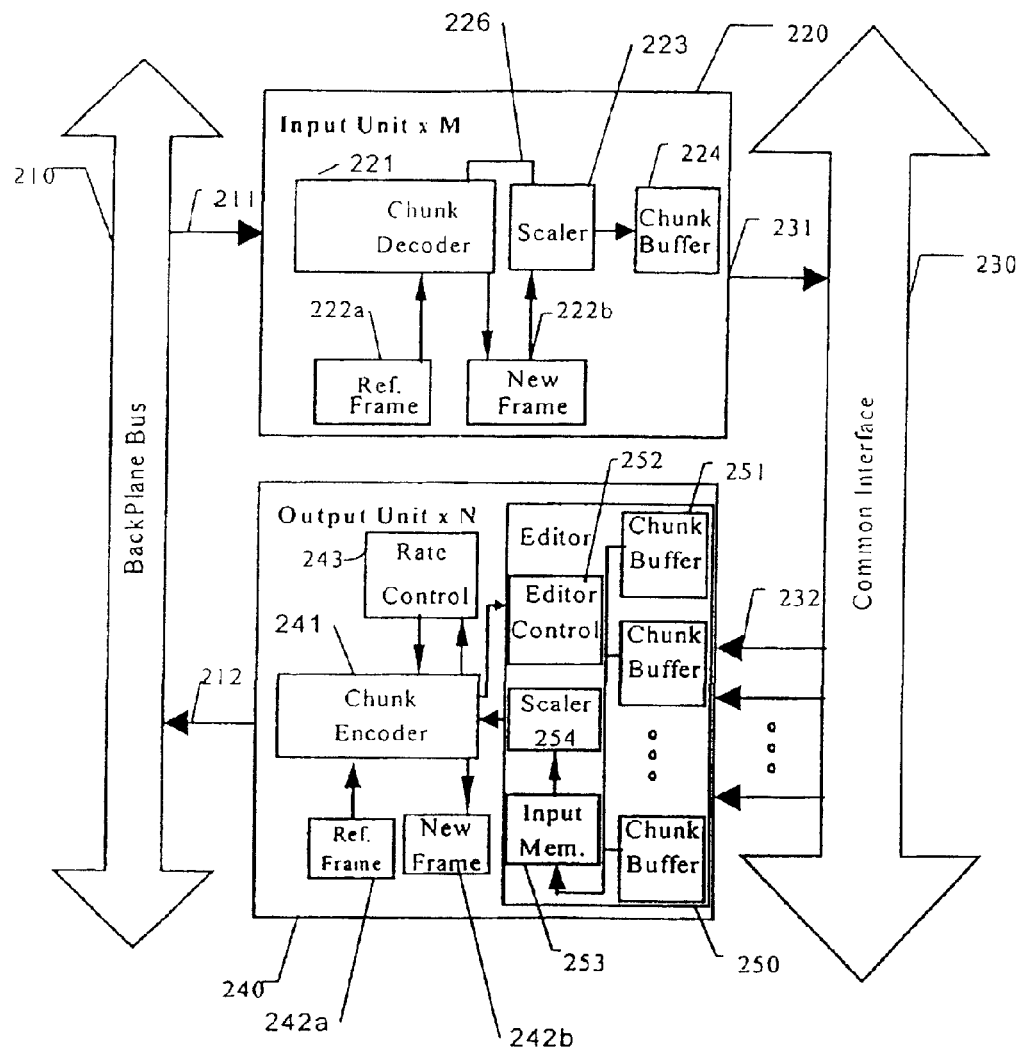
FIG. 3 is an exemplary embodiment of a video section of a VCCU, according to the present invention.

FIG. 3 illustrates an exemplary embodiment of a video section of a VCCU 200, according to the present invention. In the exemplary embodiment, an input unit 220 (also referred to as an input module) and an output unit 240 (also referred to as an output module) are connected to a backplane bus 210. Although FIG. 3 shows only one input module (i.e., 220) and one output module (i.e., 240), the scope of the present invention covers any number of input and output modules. The backplane bus 210 may be any type of a bus or transmission medium. The input module 220 and the output module 240 also interface through a common interface 230. In FIG. 3, a compressed video signal 211 is sent via the backplane bus 210 to the input module 220 in the VCCU 200. The input module 220 in turn routes the compressed video signal 211 (also referred to as an incoming video data stream) to a chunk decoder 221.

The chunk decoder 221 is a logical unit capable of processing a macroblock (MB) or any number of consecutive MBs (i.e., a chunk) from the incoming video data stream. Each chunk is decoded and forwarded for further processing without the need to wait for a whole frame to be constructed. The video is processed "chunk by chunk" and transmitted to a target via an input scaler 223 or directly to a chunk buffer 224 if scaling is not required.

The chunk decoder 221 takes the received compressed video stream 211 and based on a reference frame memory 222a and encoding standards (H.261, H.263 etc.) converts it into decoded data. The decoded data can be either represented in an image (spatial) domain, in the DCT domain, or some variation of these or other techniques. The chunk decoder 221 stores the decoded data representing a decoded chunk into appropriate addresses of a new frame memory 222b. This process overwrites any previous data stored in the appropriate addresses of the new frame memory 222b. When the chunk decoder 221 completes decoding the data of an entire decoded chunk, it sends an indication to the scaler 223 using a decoded chunk data ready line 226.

When the chunk decoder 221 finishes decoding a frame, and before the arrival of a first chunk of a next frame, the decoded data from the new frame memory 222b is transferred to the reference frame memory 222a in one embodiment of the invention, or memories 222a and 222b swap pointers in an alternate embodiment of the invention. After updating the reference frame memory 222a, the chunk decoder 221 is ready to start decoding the first chunk of the next frame.

Upon receiving the indication via the decoded chunk data ready line 226, the scaler 223 retrieves the appropriate decoded data from the new frame memory 222b, scales it, and transfers the scaled decoded data (also referred to as a scaled decoded chunk) to a chunk buffer 224. Using this method, the scaler 223 always uses the newest available decoded data. This method enables piecewise decoding, chunk by chunk, of the compressed video stream 211, piecewise scaling, and transference of corresponding uncompressed data to the common interface 230 without waiting to accumulate a full frame. Using this method reduces delay in the input module 220 of the VCCU 200.

The purpose of scaling is to change frame resolution according to an endpoint requirement or in order to later incorporate the frame into a continuous presence layout. Such a continuous presence frame may consist of a plurality of appropriately scaled frames. The scaler 223 may also apply proper filters for both decimation and picture quality preservation.

In some embodiments of the present invention, size of a decoded chunk and a scaled decoded chunk depends on a required scale factor. For example, when the video resolution needs to be reduced to a quarter (a factor of 2 in both axis), for a layout of 2×2 sources of video, the size of the decoded chunk may be two lines of MBs and the scaled decoded chunk size may be one MB. In case of a layout of 3×3 sources of video, the decoded chunk size may be three lines of MBs and the scaled decoded chunk size may be one MB.

In some exemplary embodiments, the decoded chunk may comprise a few MBs and the scaled decoded chunk may comprise a few pixels. The scaler 223 retrieves decoded data, corresponding to a new decoded chunk, from an appropriate location of the new frame memory 222b. This decoded data may also include a group of surrounding pixels needed for the scaler operation. The number of such pixels and their location within the frame depends on the scale factor, the filters, and a scaling algorithm that the scaler 223 is using. The scaler 223 always uses and processes decoded data which belong to a new decoded frame. Other embodiments may use various sizes for the decoded chunk and for the scaled decoded chunk.

The scaler 223 may be bypassed if the scaling operation is not required in a particular implementation or usage. In such a case, a decoded chunk replaces a scaled decoded chunk for the rest of the process.

The scaler 223 sends the scaled decoded chunk to the chunk buffer 224. In one embodiment the chunk buffer 224 is a two stage FIFO style memory element. Thus, the chunk buffer 224 has capacity to store two scaled decoded chunks. However, the configuration of the chunk buffer 224 depends on a configuration of the common interface 230. The common interface 230, which routes the video data between input modules and output modules, (such as the input module 220 and the output module 240), can be a shared memory, a TDM bus, an ATM bus, a serial bus, a parallel bus, a connection switching, a direct connection, or any of a variety of other structures.

In operation, the input module 220 sends a scaled decoded chunk to the common interface 230 via a line 231. The common interface 230 then routes the scaled decoded chunk to the output module 240. The VCCU 200 can have more than one output module 240, and the scaled decoded chunk can be routed to more than one output module.

The output module 240 includes an editor 250. The editor 250, in the appropriate output module 240, retrieves scaled decoded chunks via a line 232 from the common interface 230 through a chunk buffer 251. In one embodiment, the chunk buffer 251 is a two stage FIFO configured to store two scaled decoded chunks. The configuration of the chunk buffer 251 depends on the configuration of the common interface 230. As shown in FIG. 3, any number of chunk buffers 251 may be embodied in the output module 240.

The editor 250 manages uncompressed input video data that can originate from various sources. The editor 250 is comprised of the chunk buffers 251 that take or receive scaled decoded chunks from one or more input modules 220, and place the appropriate scaled decoded chunks in appropriate locations within an editor input memory 253 in order to compose a desired layout. In one embodiment, the editor input memory 253 contains a frame structure with specific locations corresponding to locations in a layout of a receiving endpoint. The frame structure may be single sourced, or it may be a composite sourced frame receiving data from various sources.

In an alternative embodiment, the editor input memory 253 is allocated a frame structure for each source. A scaler 254 retrieves data from the editor input memory 253 based on the layout. In this case, layout composition will be implemented on-the-fly from the editor input memory 253 to a chunk encoder 241 by the scaler 254.

The present invention simultaneously writes data from the appropriate chunk buffers 251 into the editor input memory 253 overwriting any old data. Concurrently, the present invention reads the appropriate chunk that has to be encoded from the editor input memory 253 via the scaler 254 to the chunk encoder 241. Using this method, the chunk encoder 241 always uses the newest available data for a current pixel in a sequence. Therefore in some cases, two adjacent pixels may come from two consecutive frames.

The present invention enables piecewise encoding, chunk by chunk, of the uncompressed video input data, and piecewise transference of the compressed data to the backplane bus 210 without waiting to accumulate a full frame to which the uncompressed video data belongs. Thus, the present invention reduces delay in the output module 240 of the VCCU 200.

The video data may be scaled (applying a suitable filter for decimation and quality) with the scaler 254, or various video inputs may be combined into one video frame by reading and transferring encoded chunks from appropriate locations in the editor input memory 253 according to a predefined or user defined layout scheme. The scaler 254 may be bypassed or not present in certain embodiments not requiring a composition function or scaling. By using the above method the editor 250 provides the most updated data to the chunk encoder 241.

It should be noted that the size of an encoded chunk can be different from the size of a decoded chunk or a scaled decoded chunk. In addition, the size of a decoded chunk or a scaled decoded chunk may be different for each of the decoders that participates in a conference.

The output module 240 also comprises an editor control 252 and a rate control 243. The editor control 252 is responsible for managing the operation of the editor 250. The rate control 243 controls a bit rate (i.e., a data rate) of an outgoing video stream.

The chunk encoder 241 essentially performs an inverse operation of the chunk decoder 221. The chunk encoder 241 retrieves encoder chunks (i.e., scaled decoded chunks) from the editor 250. Then, based on a content of a reference frame buffer 242a and the information supplied by the rate control 243, the chunk encoder 241 generates a compressed video stream and transfers the compressed video stream to the network via the backplane 210. From each compressed chunk (i.e., encoder chunk), the chunk encoder 241 decodes the compressed chunk, performs inverse transformation over the compressed chunk, and stores the results in a new frame buffer 242b. The generation of the new frame buffer 242b and the outgoing video stream is based on the chosen standard (e.g., H.261, H.263 etc.). In another embodiment of the present invention, the editor 250 transmits each relevant chunk of data to the chunk encoder 241.

When the chunk encoder 241 finishes encoding an entire frame, and before arrival of a first chunk of a next frame, the data from the new frame buffer 242b is transferred to the reference frame buffer 242a. Alternatively, the new frame buffer 242b and reference frame buffer 242a replace tasks by switching pointers. After updating the reference frame buffer 242a, the chunk encoder 241 is ready to encode the first chunk of the next incoming frame.

Figure 4:
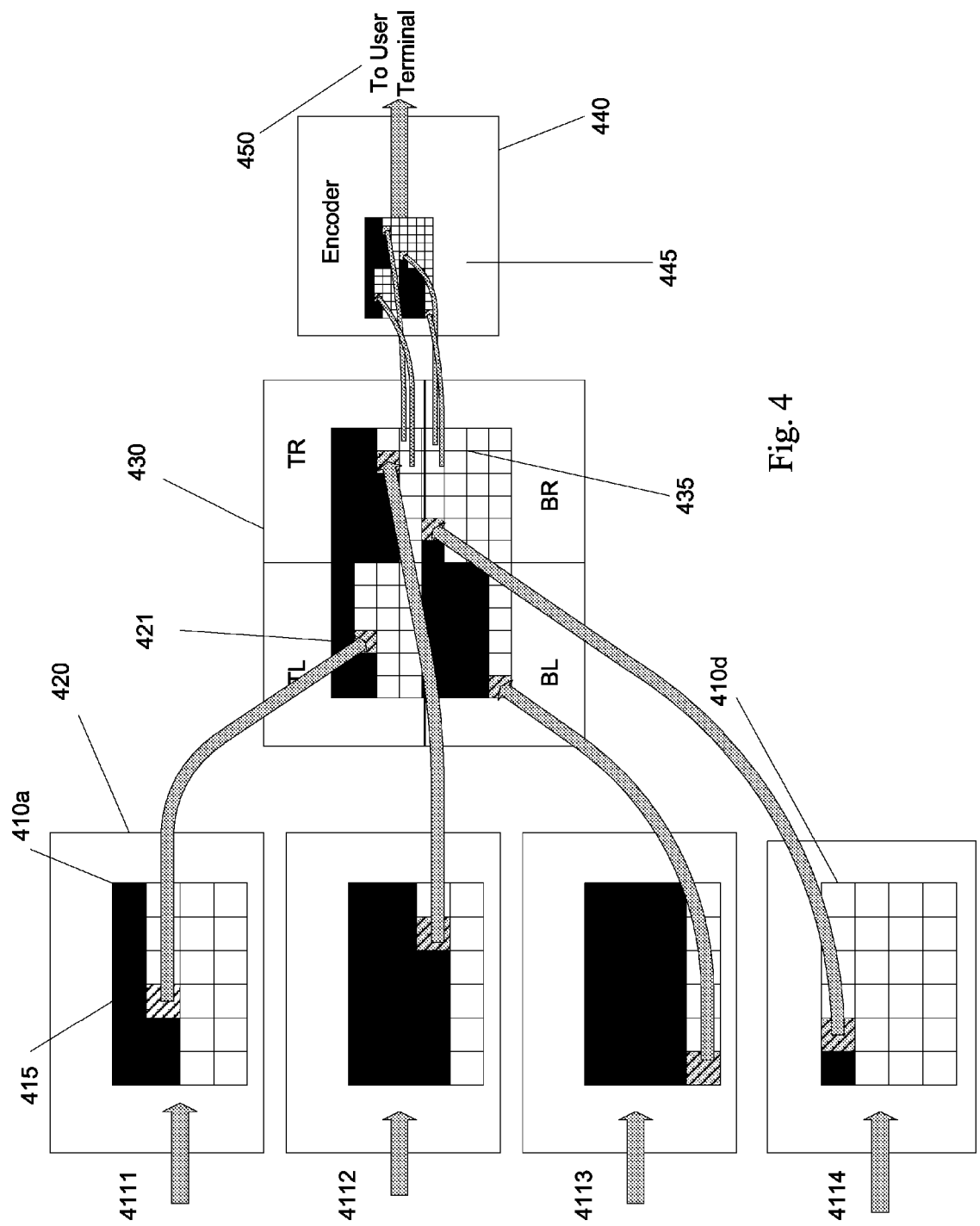
FIG. 4 illustrates a flow of video streams in an exemplary embodiment utilizing four memory maps corresponding to four input modules of the FIG. 3 VCCU and a memory map corresponding to an output module of the FIG. 3 VCCU, according to the present invention.

FIG. 4 illustrates a flow of video streams utilizing four memory maps 420 corresponding to four input modules 220 (FIG. 3) and a memory map 430 corresponding to the output module 240 (FIG. 3). In this example, the present invention is using the scaler 223 (FIG. 3) of the input module 220 while the scaler 254 (FIG. 3) of the output module 240 is bypassed.

Various chunks, 4111-4114, are received by the input modules 220 (independently for every source). Each chunk 4111-4114 is decoded into pixels by the chunk decoders 221 (FIG. 3). These pixels are saved to the new frame memory 222b in specific addresses chosen according to the pixels' coordinates. For instance, for a first of the four input modules 220 corresponding to a first memory map 420, a received chunk 4111 is stored in memory location 415 (marked with stripes) of the first memory map 420. The pixels constituting an entire frame are saved in the new frame memory 222b in an address range 410a; one address range per source. The address range 410a may contain information from two consecutive frames of the same source. The shaded area, which is before the memory location 415, corresponds to the frame that is currently being decoded, while the white area, which is after the memory location 415, corresponds to a previous decoded frame. In some embodiments, it is possible to save side information (e.g., quantizer, motion vectors, MTYPE, MB type etc.) for supporting the encoding process.

The chunk decoder 221, upon finishing decoding the current chunk 4111 and saving the decoded chunk to the memory location 415, indicates via the decoded chunk data ready line 226 that the scaler 223 may start to process the new data (i.e., the decoded chunk). The scaler 223 retrieves the appropriate decoded pixels from the memory location 415 according to a scale factor and any filters that may be used. The scaler 223 then filters and down samples these pixels, possibly using other pixels located near the decoded pixels which belong to the new frame in the filtering process. Ultimately the results are available on the common interface 230 (FIG. 3) and saved in the editor input memory 253 (FIG. 3) of the output module 240 in a location 421 of the memory map 430.

The scaled frames from all the decoders 221 are saved in an address range of the memory map 430 (TL, TR, BL, BR) of the output module 240, which, is divided into four quarters. In this exemplary embodiment, a Top Left (TL) quarter is used by the first of the four input modules 220 corresponding to the first memory map 420. A Top Right (TR) quarter is used by a second of the four input modules 220 corresponding to a second memory map 420. A Bottom Left (BL) quarter is used by a third of the four input modules 220 corresponding to a third memory map 420, and a Bottom Right (BR) quarter by a fourth of the four input modules 220 corresponding to a fourth memory map 420. When the chunk encoder 241 (FIG. 3 and FIG. 4) transmits an encoded chunk 445, it takes appropriate pixel data from the address range of the memory map 430 (TL, TR, BL, BR) of the output module 240 (e.g., an address area 435 of the editor input memory 253, which is the most current data available for a needed location in a layout). Next, the pixels associated with the address area 435 (encoder chunk) are taken by the chunk encoder 241, and encoded (compressed) with or without using side information saved by the decoders 221. The compressed data corresponding to the address area 435 are then transferred to an endpoint.

Overall, this invention will improve the quality of video communication by reducing the delay resulting from the VCCU 200 (FIG. 3) waiting to receive a full frame before processing the video stream. Reducing these processing delays will provide a higher quality video conference and will improve the real-time performance between the participants. Thus, this invention will be useful because of the increasing dependence on video communication technology, and the need to improve video stream processing to create a conference as life-like as possible.

In the description and claims of the present application, each of the verbs, "comprise" "include" and "have", and conjugates thereof, are used to indicate that the object or objects of the verb are not necessarily a complete listing of members, components, elements, or parts of the subject or subjects of the verb.

The present invention has been described using detailed descriptions of embodiments thereof that are provided by way of example and are not intended to limit the scope of the invention. The described embodiments comprise different features, not all of which are required in all embodiments of the invention. Some embodiments of the present invention utilize only some of the features or possible combinations of the features. Variations of embodiments of the present invention that are described and embodiments of the present invention comprising different combinations of features noted in the described embodiments will occur to persons of the art. The scope of the invention is limited only by the following claims.

What is claimed is:

1. A video communications control unit for processing video signals in a video communication, comprising:
   an input module that:
      receives a compressed video data stream from an originating source;
      decodes the compressed video data stream one chunk at a time to create a series of decoded chunks; and
      routes each decoded chunk as it is created over a common interface to an output module without waiting to decode an entire frame; and
   an output module that:
      retrieves the routed decoder chunks as encoder chunks;
      encodes each encoder chunk; and
      transmits the encoded encoder chunks to a target without waiting to encode an entire frame.

2. The control unit of claim 1, wherein the input module stores pixel data corresponding to each decoded chunk in a new frame memory of the input module.

3. The control unit of claim 2, wherein the storing pixel data further comprises transferring the stored pixel data in the new frame memory to a reference frame memory located in the input module once all the pixel data corresponding to a frame has been stored.

4. The control unit of claim 3, wherein the transferring the stored pixel data in the new frame memory to a reference frame memory comprises replacing a pointer data for the new frame memory with a pointer data for the reference frame memory, and replacing the pointer data for the reference frame memory with the pointer data for the new frame memory.

5. The control unit of claim 3, wherein the transferring the stored pixel data in the new frame memory to a reference frame memory comprises writing the pixel data in the new frame memory over data in the reference frame memory.

6. The control unit of claim 1, wherein the input module:
   scales the stored pixel data into a scaled decoded chunk; and
   outputs the scaled decoded chunk while still processing other segments of a frame of the compressed video data stream to which the scaled decoded chunk belongs.

7. The control unit of claim 6, wherein the outputting the scaled decoded chunk further comprises transferring the scaled pixel data to a common interface.

8. The control unit of claim 1, wherein the output module:
   retrieves the routed decoder chunks from the common interface as uncompressed video data;
   compresses the chunks of uncompressed video data to create a compressed video data chunk; and
   outputs the compressed video data chunk while receiving and compressing a subsequent chunk of uncompressed video data of the same video frame as the outputted compressed video data chunk.

9. The control unit of claim 8, wherein the output module:
   identifies a data rate for an intended target of the compressed video data chunk; and
   compresses the chunk of the uncompressed video data in accordance with the data rate.

10. The control unit of claim 1, wherein the output module scales and compresses the encoded encoder chunk.

11. The control unit of claim 1, wherein the output module:
   receives decoded chunks as encoder chunks from a plurality of input modules; and
   composes a layout comprising the encoder chunks, the layout comprising video data from a plurality of video sources.

12. The control unit of claim 11, wherein the output module writes the received decoded chunks from the plurality input modules into a memory, the memory comprising a frame structure with specific locations corresponding to locations in the layout for video data from the plurality of video sources.

13. A video communications control unit for processing video signals in a video communication, comprising:
   a backplane bus that carries compressed video data received from a plurality of video sources and compressed video data to be transmitted from the video communications control unit to one or more targets;

an input module that:
  retrieves a compressed video data from an originating source from the backplane bus;
  decodes the compressed video data stream one chunk at a time to create a series of decoded chunks;
  routes each decoded chunk as it is created over a common interface to an output module without waiting to decode an entire frame; and an output module that:
  retrieves the routed decoder chunks as encoder chunks;
  encodes each encoder chunk; and
  transmits the encoded encoder chunks to the backplane bus without waiting to encode an entire frame.

14. The control unit of claim 13, wherein the output module:
  identifies a data rate for the target; and
  compresses the chunk of the uncompressed video data in accordance with the data rate.

15. The control unit of claim 13, wherein the output module scales and compresses the encoded encoder chunk.

16. The control unit of claim 13, wherein the output module:
  receives decoded chunks as encoder chunks from a plurality of input modules; and
  composes a layout comprising the encoder chunks, the layout comprising video data from a plurality of video sources.

* * * * *